(12) United States Patent
Hayashi (10) Patent No.: US 6,682,131 B2
(45) Date of Patent: Jan. 27, 2004

(54) VEHICLE HAVING STRUCTURE FOR PREVENTING ENTRY OF WATER DROPS INTO ENGINE COMPARTMENT THEREOF

(75) Inventor: Masanori Hayashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/313,410

(22) Filed: Dec. 5, 2002

(65) Prior Publication Data

US 2003/0107243 A1 Jun. 12, 2003

(30) Foreign Application Priority Data

Dec. 10, 2001 (JP) .......................................... 2001-376372

(51) Int. Cl.[7] .............................................. B62D 25/08
(52) U.S. Cl. ....................................................... 296/192
(58) Field of Search ................................. 296/192, 194, 296/203.02

(56) References Cited

U.S. PATENT DOCUMENTS 5,692,953 A * 12/1997 Bell et al. .................... 296/192
6,193,305 B1 * 2/2001 Takahashi .................... 296/192

FOREIGN PATENT DOCUMENTS

JP          10-45035          2/1998

* cited by examiner

Primary Examiner—Dennis H. Pedder
(74) Attorney, Agent, or Firm—Merchant & Gould, P.C.

(57) ABSTRACT

A vehicle having an engine compartment and a passenger compartment formed therein includes a cowl and a dash board disposed below the dash board. The cowl is halved into right and left halves. The dash board includes a dash board body and a dash board flange. The cowl includes a cowl body, a cowl flange, and a cover portion. A seal member is interposed between the dash board flange and the cowl flange. The seal member has a portion tightly contacting the cover portion and the dash board body.

4 Claims, 11 Drawing Sheets

VEHICLE HAVING STRUCTURE FOR PREVENTING ENTRY OF WATER DROPS INTO ENGINE COMPARTMENT THEREOF

FIELD OF THE INVENTION

The present invention relates generally to a vehicle having a structure for preventing water drops between a cowl and a dash board from entering an engine compartment.

BACKGROUND OF THE INVENTION

Known vehicles have structures for preventing water drops from entering engine compartments. The structures have cowls and dash boards disposed below the cowls. The dashboards are positioned to separate the engine compartments from passenger compartments. The cowls include grill for taking in air from outside the vehicles. The cowls sealingly engage the dash boards such that water drops passing through the grills fail to enter the engine compartments.

Japanese Patent Laid-Open Publication No. HEI 10-45035 entitled "COWL LOUVER" discloses a cowl having its upper part covered by a cowl louver extending forwardly from a windshield of an automobile. The cowl louver has inlet ports formed therein. The cowl has a passageway formed therewithin. The apertures of the cowl louver communicate with the passageway. Air outside the automobile is introduced into the passageway through the inlet ports.

The cowl louver is halved to provide right and left halves. These halves butt against each other at a widthwise center of the automobile. The thus halved cowl louver is relatively easy to manufacture.

Each half has a horizontal projection member extending from a front end thereof into an engine compartment of the automobile. The projection member is in the form of a flange. Like wise, the cowl has a horizontal flange extending from an upper end thereof into the engine compartment. The cowl is coupled to the halves of the cowl louver with the projection members lying on the flange.

Drops of water such as raindrops could enter into the inlet ports of the cowl louver. Most of the drops travel along a surface of the cowl out of the automobile.

However, part of the drops travels along an interior surface of the cowl louver and then between the projection members and the flange, after which it can leak into the engine compartment. Such a leakage occurs mostly at the widthwise center where the halves of the cowl louver butt establishing an insufficient sealing engagement therebetween.

It is preferred that an amount of drops to leak from the widthwise center into the engine compartment having various electrical components accommodated therein be as small as possible.

SUMMARY OF THE INVENTION an object of the present invention is to provide a structure for preventing water drops passing through a halved cowl from entering into an engine compartment.

According to one aspect of the present invention, there is provided a vehicle including a vehicle body having an engine compartment and a passenger compartment formed therein, said vehicle comprising: (A) a cowl mounted to said vehicle body and having a grill formed therein for taking in external air; (B) a dash board disposed below said cowl to separate said engine compartment from said passenger compartment; said dash board including: (a) a dash board body; (b) a dash board flange extending from an upper end of said dash board body into said engine compartment; said cowl extending in a widthwise direction of said vehicle body and comprising right and left halves each including: (a) a cowl body; (b) a cowl flange extending from a lower end of said cowl body into said engine compartment to cover said dash board flange; (c) a cover portion extending from said lower end of said cowl body to cover said upper end of said dash board body; and said dash board flange and said cowl flange having a seal member disposed in a space formed therebetween, said seal member sealing said space, said seal member having a portion tightly contacting said cover portion and said dash board body.

Preferably, said cowl flange and said cover portion have proximal portions formed integrally with said lower end of said cowl body, said proximal portions of said cowl flange and said cover portion tightly contacting said portion of said seal member.

The cover portion extends from the lower end of the cowl body to cover the upper end of the dash board body and the dash board flange. Provision of the cover portion allows most of water drops, which have passed through the grill to the cover portion, to travel out of the vehicle without entering a space between the dash board flange and the cowl flange. Part of the water drops on an exterior surface of the cover portion can cross over a distal edge of the cover portion and then travel on an interior surface of the cover portion towards the space between the cowl flange and the dash board flange. The seal member interposed between the dash board flange and the cowl flange extends in substantially parallel to the cowl flange and the cover portion with a clearance formed between the cover portion and the dash board body. The clearance extends along the length of seal member.

The seal member has a portion held in intimate contact with the proximal portions of the cowl flange and the cover portion. The portion of the seal member blocks the clearance. In other words, the travel of the part of water drops through the clearance is blocked. It is therefore unlikely that the water drops within the clearance enter the engine compartment.

The cover portion serves to prevent water drops, which has passed through the grill onto the cowl body, from traveling into the space between the cowl flange and the dash board flange. The clearance formed between the proximal portions is blocked by the portion of the seal member. Use of such a seal member provides the advantage that the least amount of water drops having passed into the clearance enters the engine compartment.

The seal member is partially brought into tight contact with the proximal portions more easily than it is throughout the length thereof.

Preferably, said portion of said seal member tightly contacting said proximal portions of said cowl flange and said cover portion is located in the proximity of a boundary between said right and left halves of said cowl.

The clearance is blocked at a position close to the boundary between the halves. The water drops traveling from the exterior surface across the distal end of the cover portion of greater area into the clearance are prevented from traveling to the boundary.

Preferably, said proximal portions of said cowl flange and said cover portion and said lower end of said cowl body come together to form a corner portion, said corner portion, said proximal portions of said cowl flange and said cover portion and said portion of said seal member tightly contacting said proximal portions of said cowl flange and said cover portion having plural partition sheets provided in a space defined therebetween, said partition sheets being disposed side by side with each other in the widthwise direction of said vehicle body and spaced at predetermined intervals.

The partition sheets are in sealing engagement with both the portion of the seal member and the corner portion.

BRIEF DESCRIPTION OF THE DRAWINGS

Certain preferred embodiments of the present invention will hereinafter be described in detail, by way of example only, with reference to the accompanying drawings, in which.

(a) of FIG. 15 is a view obtained when viewing the right and left halves in a direction of arrow A of FIG. 14, and (b) of FIG. 15 is a cross-sectional view taken along line B—B of FIG. 14.

(a) of FIG. 16 is analogous to (a) of FIG. 15, showing right and left halves of a conventional cowl for the purpose of comparison, and (b) of FIG. 16 is analogous to (b) of FIG. 15, showing the right and left halves of the conventional cowl of (a) of FIG. 16; and (a) and (b) of FIG. 17 each show a seal member and a cowl modified according to the present invention.

DETAILED DESCRIPTION OF THE PREFERRED EMBODIMENTS

Figure 1:
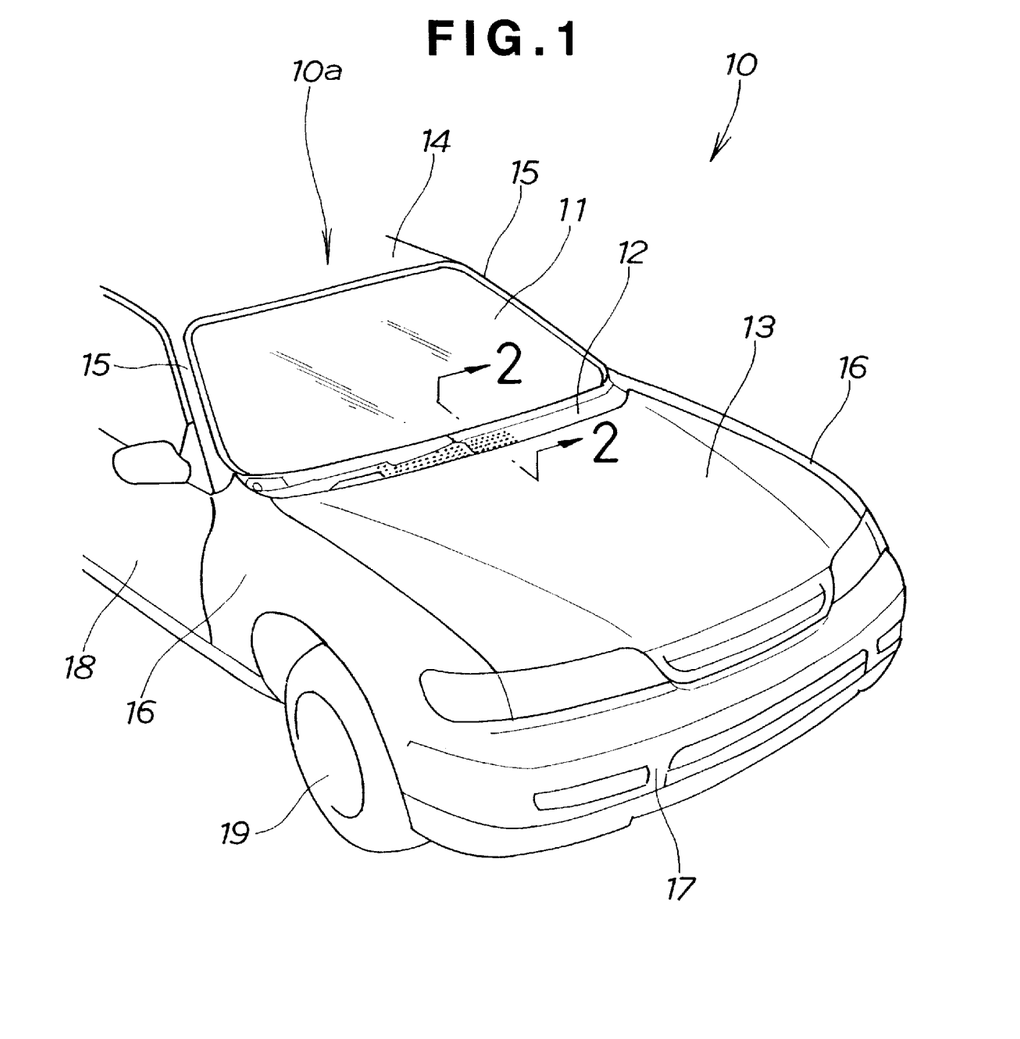
FIG. 1 is a perspective view of a front part of a vehicle.

Referring to FIG. 1, a vehicle or an automobile 10 includes a vehicle body 10a. The vehicle body 10a has a windshield 11 and a cowl 12 mounted thereto. The windshield 11 has the cowl 12 extending forwardly from a lower portion thereof. A hood (bonnet) 13 is positioned in front of the cowl 12.

A roof panel is indicated at 14. Front pillars 15, 15 are illustrated at 15, 15. Reference numerals 16, 16 denote front fenders. A bumper 17 is shown at 17. Reference numerals 18, 19 denote a door and one of two front wheels, respectively.

Figure 2:
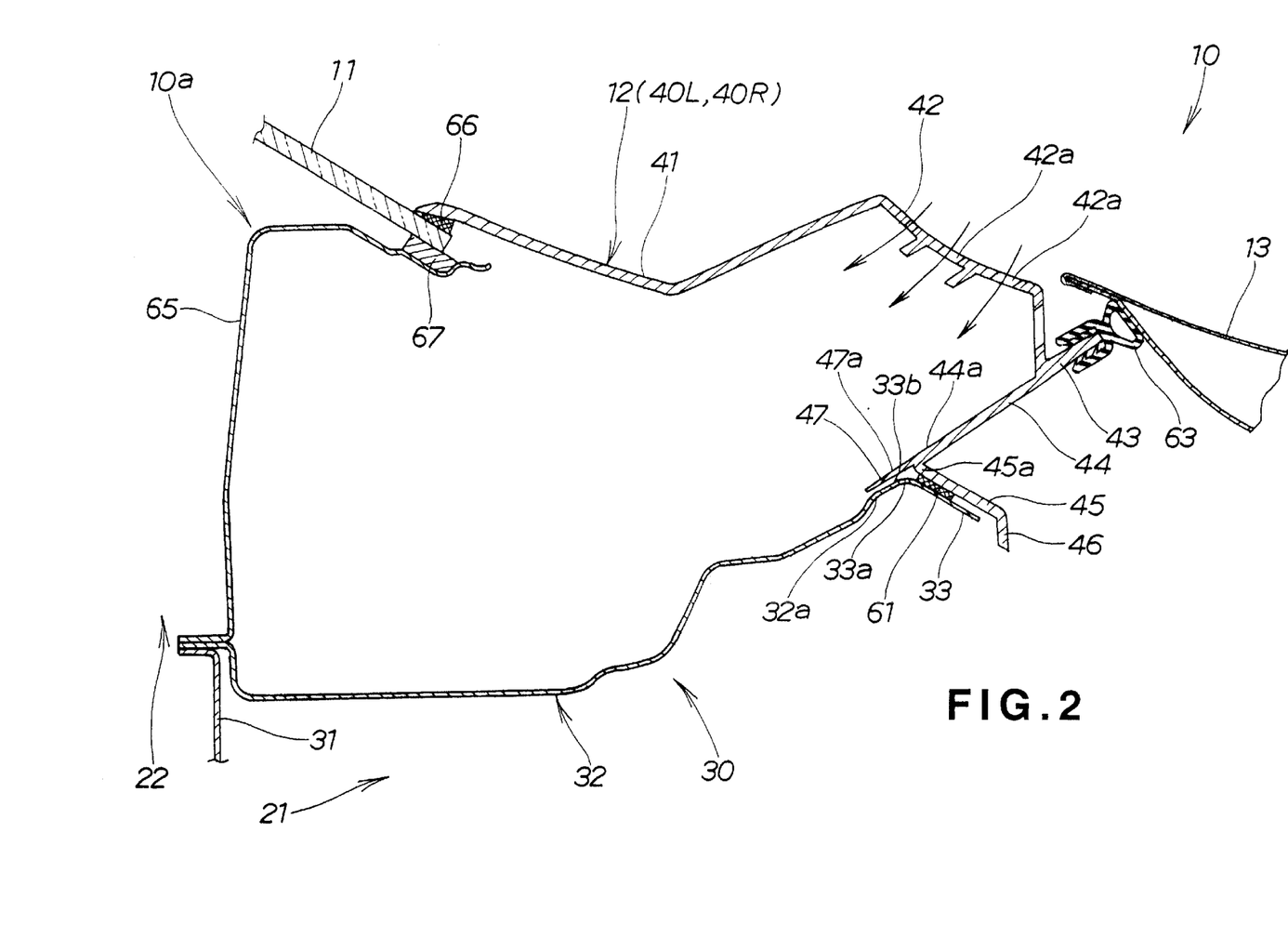
FIG. 2 is a cross-sectional view taken along line 2—2 of FIG. 1.

Turning to FIG. 2, the vehicle body 10a has an engine compartment 21 and a passenger compartment 22 formed therein. The engine compartment 21 is separated from the passenger compartment 22 by a dash board 30. The dash board 30 is disposed below the cowl 12.

The dash board 30 includes a vertically oriented lower sheet 31 and a horizontally oriented upper sheet (a dash board body) 32 jointed to an upper portion of the lower sheet 31. The upper sheet 32 has a dash board flange 33 extending from an upper end 32a thereof into the engine compartment 21. The flange 33 has its proximal portion 33a formed integrally with the upper end 32a. The flange 33 extends forwardly in a slightly inclined position.

The cowl 12 includes substantially horizontal panel bodies (cowl bodies) 41, 41 (only one shown) positioned at an upper part thereof. Each panel body 41 has a grill 42 formed at a front part thereof for taking in air from outside the cowl 12 or the vehicle 10. The grill 42 has a seal mounting portion 43 extending forwardly and upwardly from a lower end thereof. The portion 43 is of flat sheet-shaped configuration. The grill 42 has a lower panel portion 44 extending rearwardly and downwardly from the lower end thereof. The lower panel portion 44 is of flat sheet-shaped configuration. The lower panel portion 44 has a flange (cowl flange) 45 extending forwardly and downwardly from a lower end 44a thereof. The flange 45 has an edge 46 extending downwardly from a front end thereof. The lower panel portion 44 has a cover portion 47 extending rearwardly and downwardly from the lower end 44a thereof. The cover portion 47 is of flat sheet-shaped configuration. The panel body 41 is formed integrally with the grill 42. The grill 42 is formed integrally with the seal mounting portion 43 and the lower panel portion 44. The lower panel portion 44 is formed integrally with the flange 45 and the cover portion 47. The cover portion 47 has its proximal portion 47a formed integrally with the lower end 44a.

The flange 45 extends from the lower end 44a into the engine compartment 21 to cover the flange 33 of the dash board 30. The flange 45 has its proximal portion 45a formed integrally with the lower end 44a. The cover portion 47 extends from the lower end 44a to cover the upper end 32a and the proximal portion 33a of the flange 33 of the dash board 30. More specifically, the cover portion 47 extends obliquely from the lower end 44a towards an upper side 33b of the proximal portion 33a.

A seal member 61 is interposed between the flanges 33, 45 to sealingly engage the flanges 33, 45. In other words, the seal member 61 seals a space formed between the flanges 33, 45.

The grill 42 has a large number of apertures 42a formed therein for taking in external air, as explained hereinbefore. A seal member 63 is fitted over the seal mounting portion 43 for sealing engagement with a rear part of the hood 13.

A windshield lower panel 65 extends downwardly from the lower portion of the windshield 11. The windshield lower panel 65 has its lower portion lying on a joining portion where a rear portion of the upper sheet 32 is joined to the upper portion of the lower sheet 31. The lower portion of the windshield lower panel 65 is joined to the joining portion. Seal members 66, 67 are disposed to sealingly engage the lower portion of the windshield 11.

Figure 3:
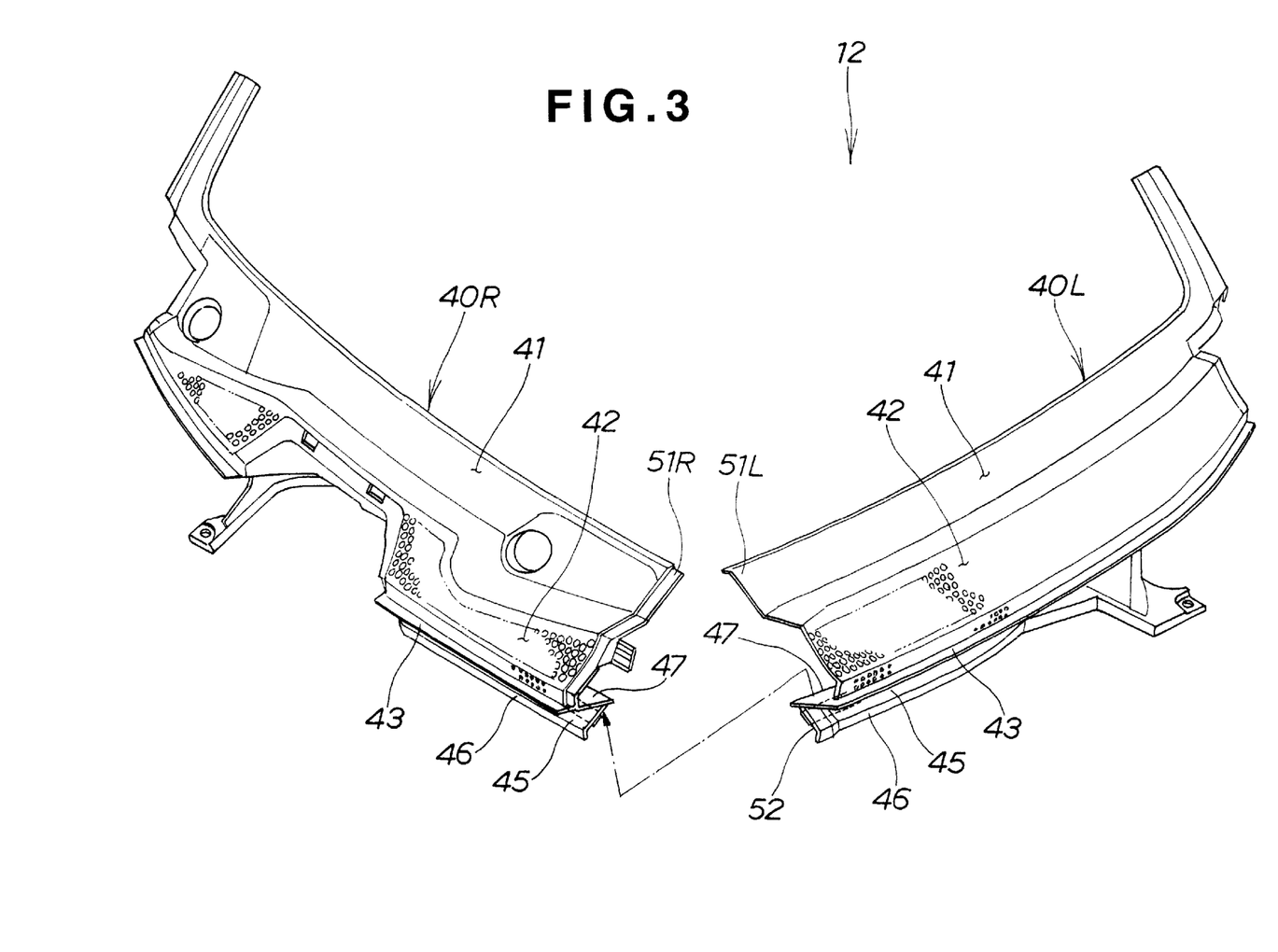
FIG. 3 is a perspective view of a cowl of the vehicle according to the present invention.

Reference is made to FIG. 3. The cowl 12 extends in a widthwise direction of the vehicle body 10a and is halved at a widthwise center of the vehicle 10 to provide right and left halves 40R, 40L.

Each of the halves 40R, 40L has the flange 45 extending from the lower end 44a of the lower panel portion 44 of the panel body 41 towards the engine compartment 21.

Figure 4:
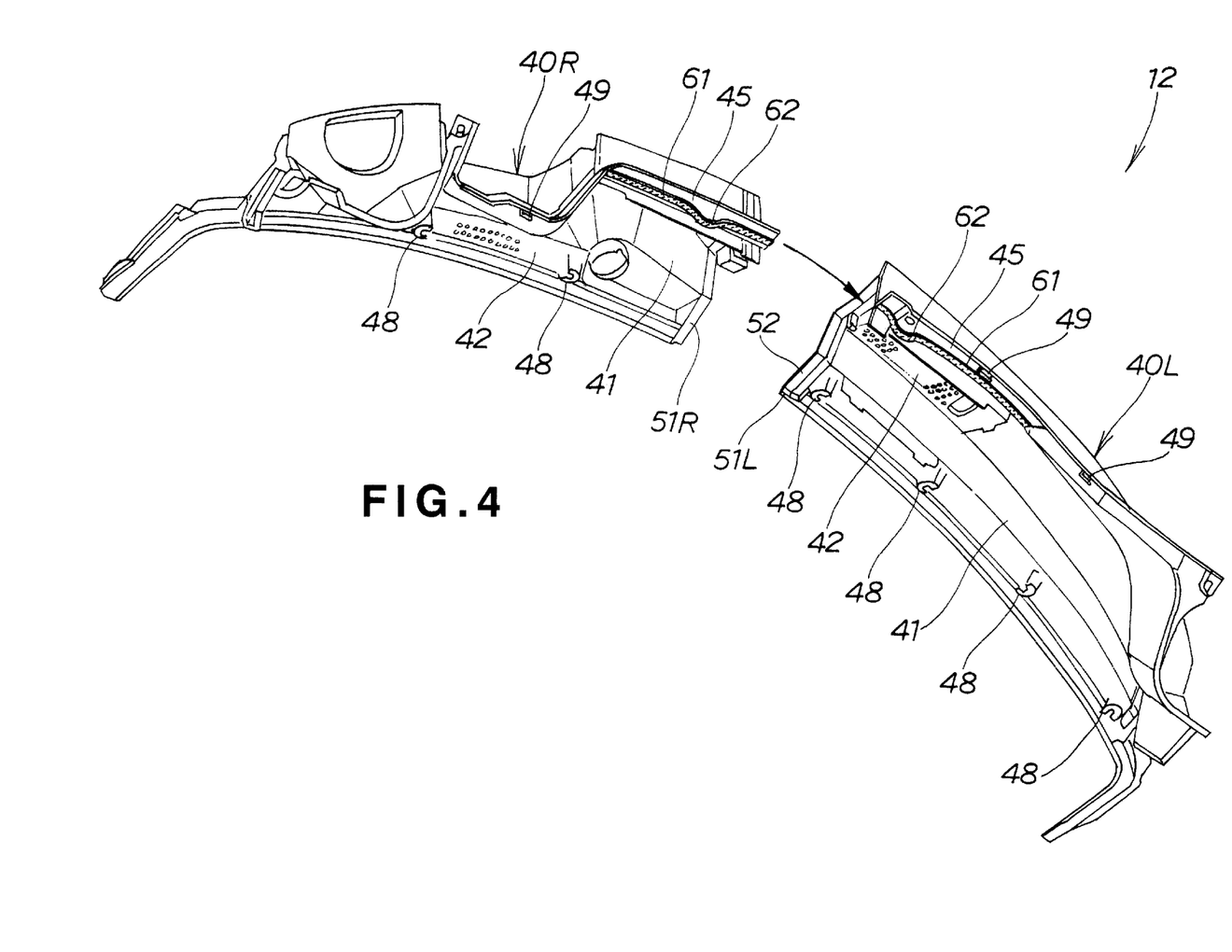
FIG. 4 is a perspective view of the cowl as turned inside out.

In FIG. 4, there is shown the halved cowl 12 as turned inside out. The cowl 12 has plural attachment portions 48 formed on an underside thereof. The attachment portions 48 are to be fastened to the dash board 30 through screws. The seal members 61, 61 are square in cross-section and elongated in the widthwise direction of the vehicle body 10a. The seal members 61, 61 extend along the flanges 45, 45.

Figure 5:
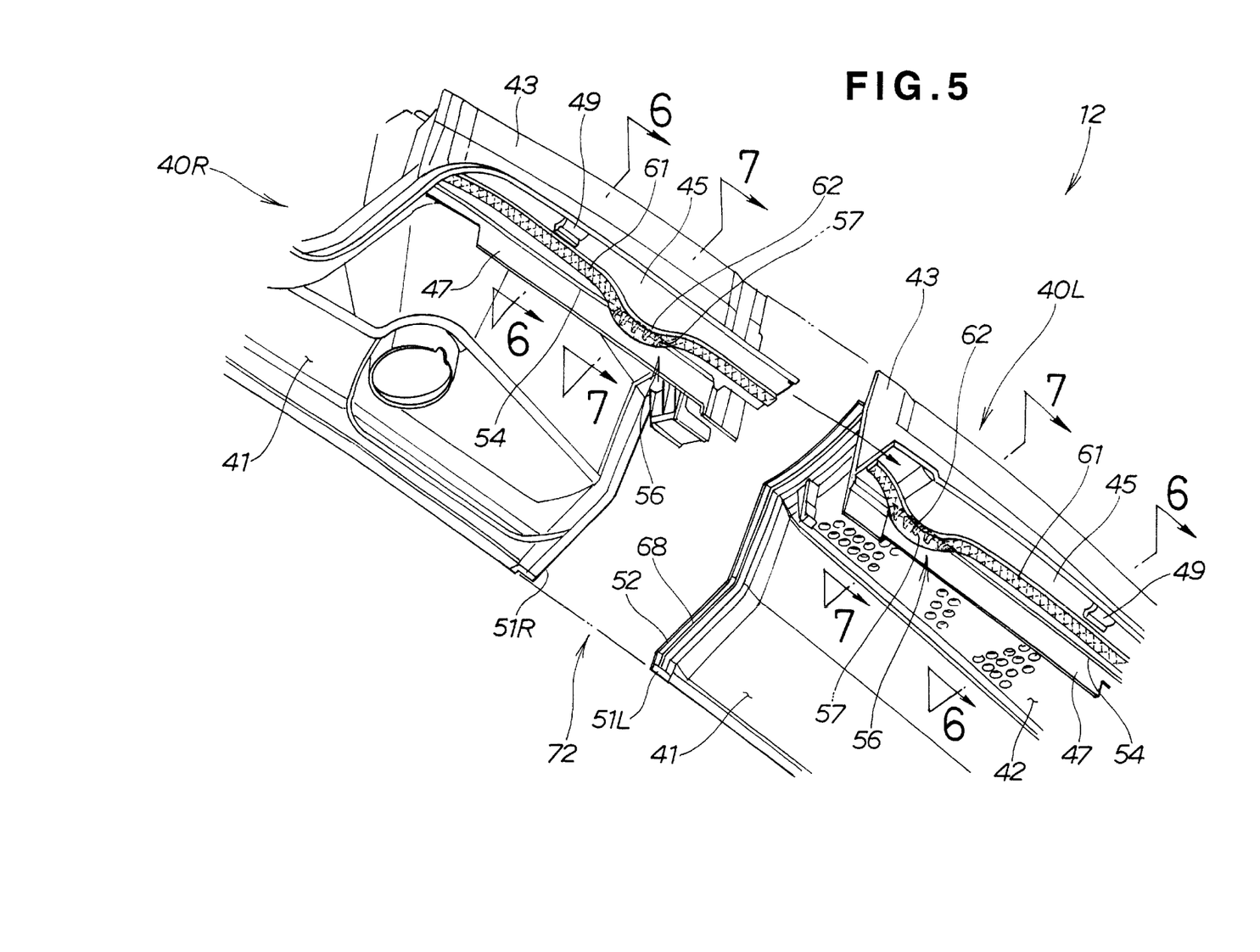
FIG. 5 is a fragmentary perspective view of right and left halves of the cowl as separated from each other.

As shown in FIG. 5, the left half 40L has an overlaying portion 52 formed at an end 51L thereof. The portion 52 is to overlie an end 51R of the right half 40R. The overlaying portion 52 has a seal member 68 provided throughout the length thereof. The seal member 68 is to seal a gap formed at a boundary 72 between the right and left halves 40R, 40L.

Figure 6:
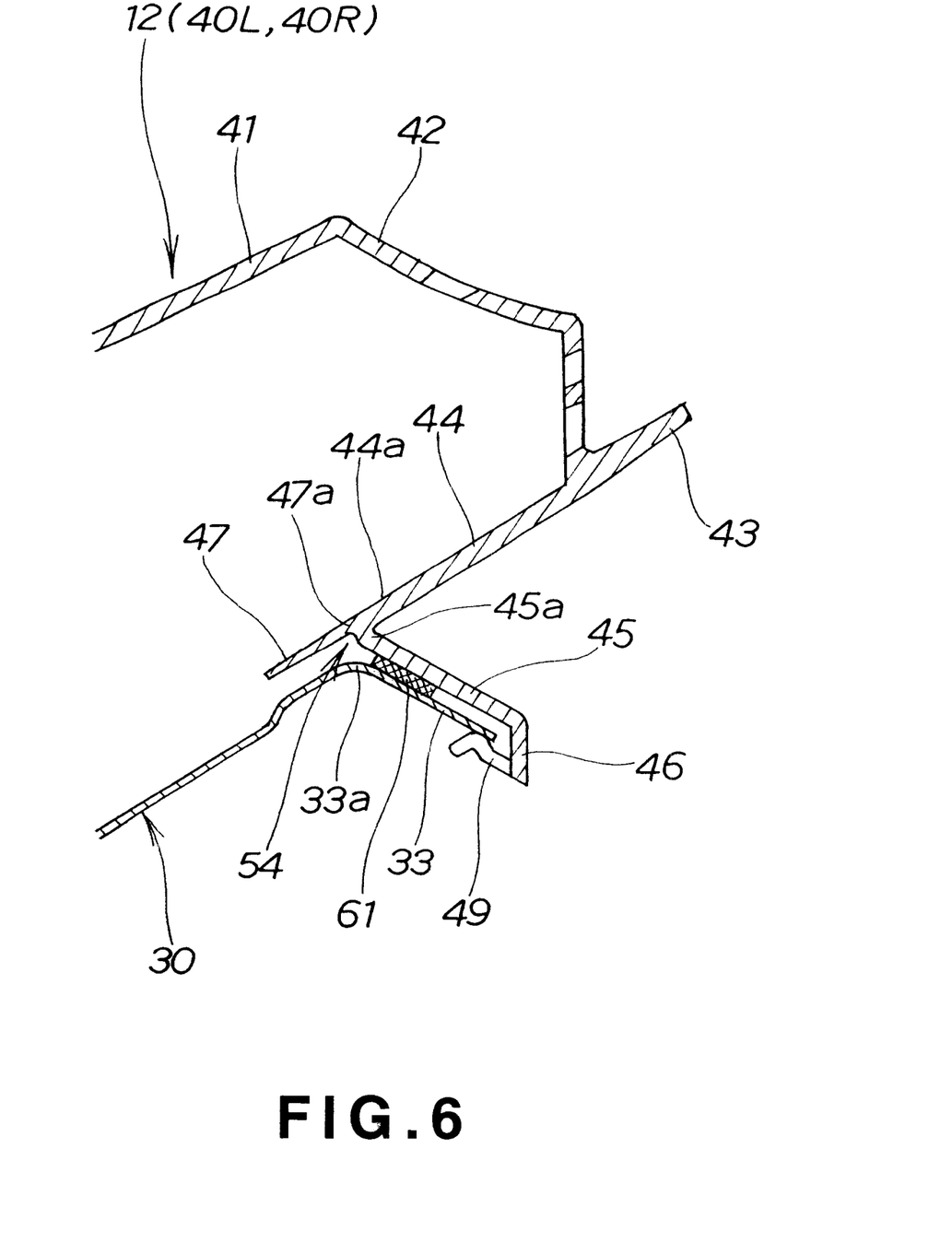
FIG. 6 is a cross-sectional view taken along line 6—6 of FIG. 5.

Referring to FIG. 6, the lower end 44a, the proximal portion 45a of the flange 45 and the proximal portion 47a of the cover portion 47 come together to form a corner portion 54. In other words, they converge or meet each other at the corner portion 54. The seal member 61 is shown as being spaced forwardly from the corner portion 54.

The flange 45 has an elastic claw 49 formed integrally with a distal end thereof. The claw 49 snaps to come into engagement with the flange 33 of the dash board 30.

Turning back to FIG. 5, each seal member 61 has a portion 62 concavely curved towards the corner portion 54. The curved portion 62 is in intimate or tight contact with the proximal portions 45a, 47a of the flange 45 and the cover portion 47 and with the upper end 32a and the proximal portion 33a, as will be described later.

As can be seen from FIG. 5, the curved portion 62 of the seal member 61 tightly contacting the proximal portions 45a, 47a of the flange 45 and the cover portion 47 is located in the proximity of the boundary 72 between the right and left halves 40R, 40L. Namely, the curved portion 62 is positioned proximate the boundary or a division portion 72 at which the cowl 12 is divided into two.

Figure 7:
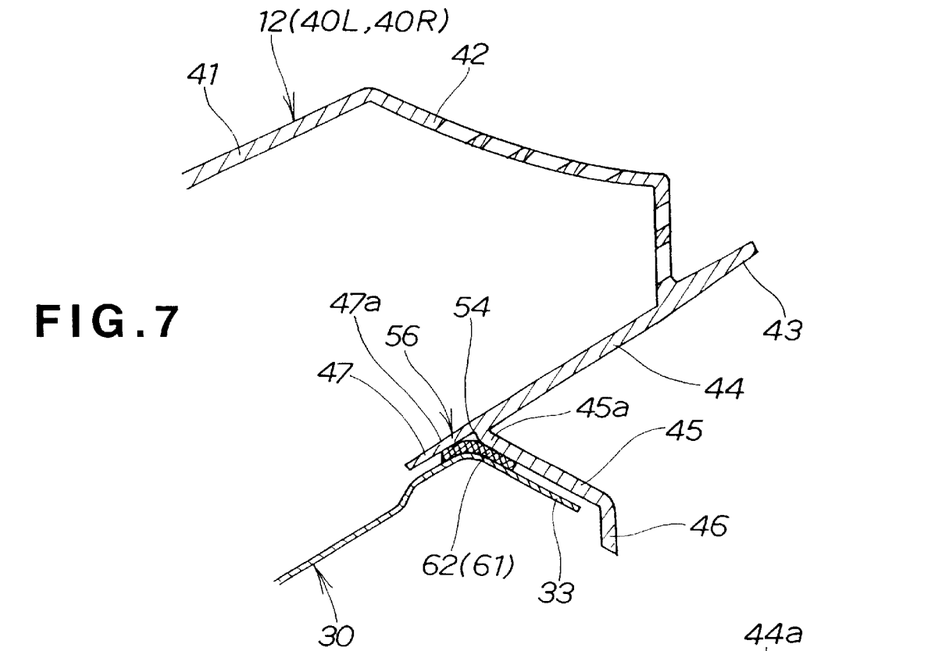
FIG. 7 is a cross-sectional view taken along line 7—7 of FIG. 5.
Figure 8:
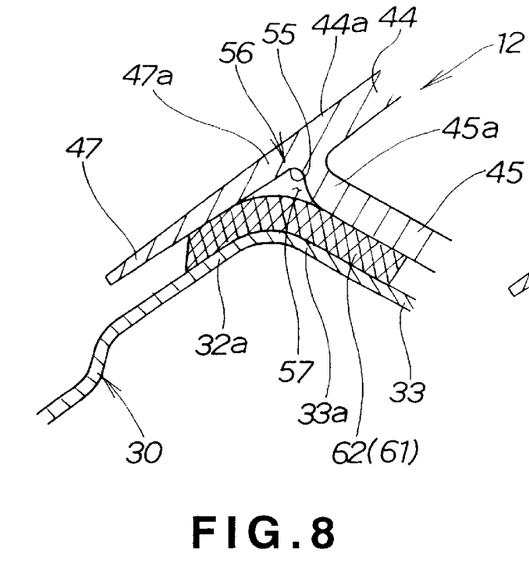
FIG. 8 is an enlarged fragmentary view of a portion of FIG. 7, showing the cowl, a dash board, a seal member interposed between the cowl and the dash board.
Figure 9:
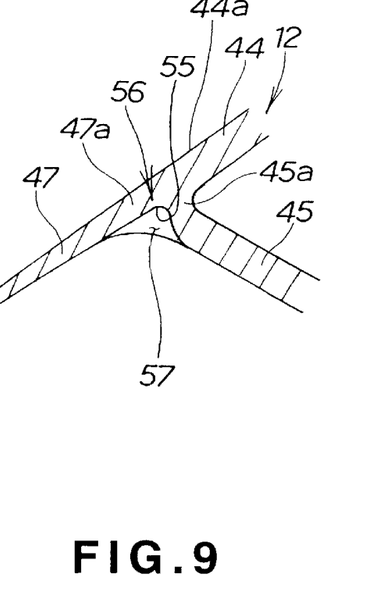
FIG. 9 is analogous to FIG. 8 with the dash board and the seal member removed.

Referring to FIG. 7 through FIG. 9, the corner portion 54 has a groove 55 formed thereon. The groove 55 extends in the widthwise direction of the vehicle body 10a. Provision of the groove 55 helps the curved portion 62 better tightly contact partition sheets 57. It is to be noted that the corner portion 54 may not have any groove 55 formed thereon. The partition sheets (only one shown) 57 are fitted within a space jointly defined by the corner portion 54, the proximal portions 45a, 47a and the curved portion 62.

Figure 10:
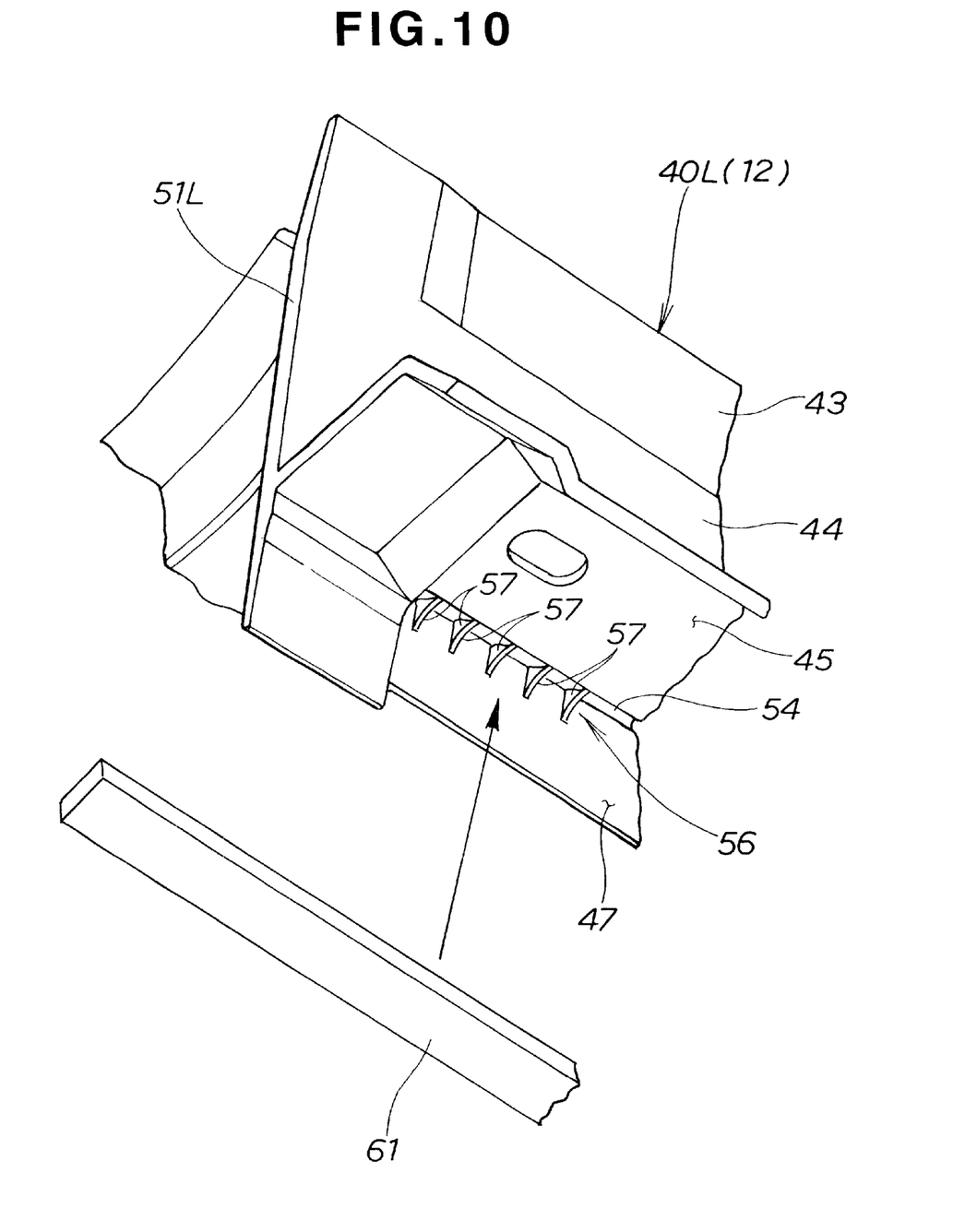
FIG. 10 is a fragmentary perspective view of a portion of the left half of the cowl as seen from below.

With respect to FIG. 10, at the corner portion 54, the plural partition sheets 57 are juxtaposed in the widthwise direction of the vehicle body 10a and spaced from each other by a predetermined interval. Each partition sheet 57 is formed integrally with the corner portion 54. It will be understood that the right half 40R is the same as the left half 40L in that the partition sheets 57 are disposed in the widthwise direction of the vehicle body 10a and spaced at the predetermined intervals.

Figure 11:
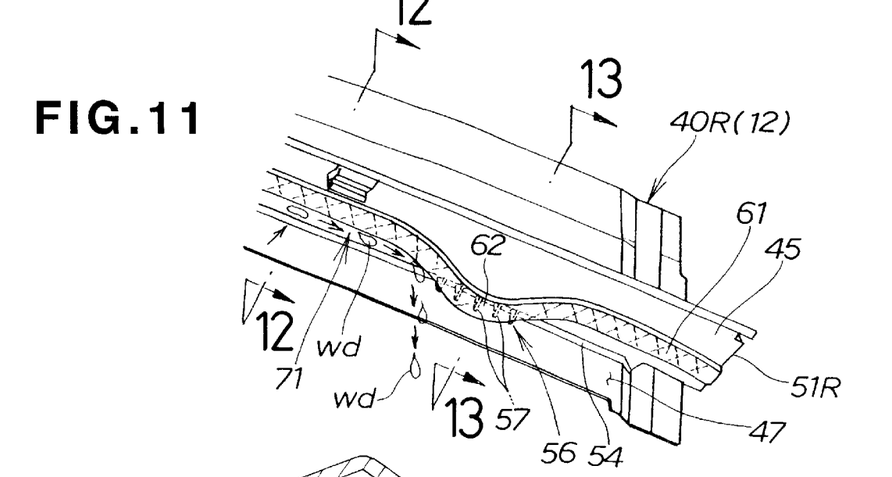
FIG. 11 is a fragmentary perspective view of an end of the left half and its surroundings.
Figure 12:
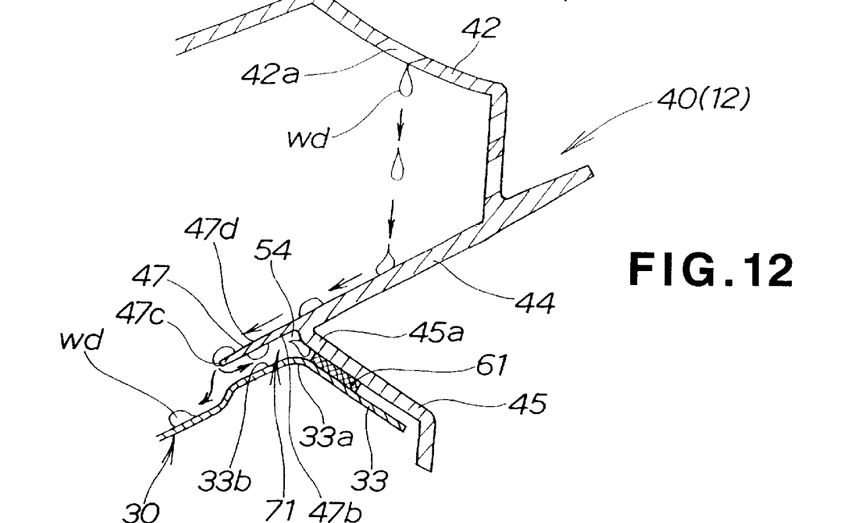
FIG. 12 is a cross-section taken along line 12—12 of FIG. 11.
Figure 13:
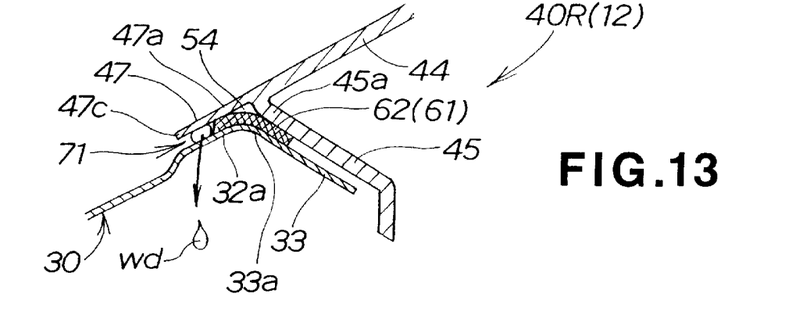
FIG. 13 is a cross-sectional view taken along line 13—13 of FIG. 11.

Reference is made to FIG. 11 through FIG. 13. The cowl 12 has the cover portion 47 extending obliquely downwardly to cover the upper end 32a and the proximal portion 33a of the flange 33 of the dash board 30. In other words, the cover portion 47 extends towards the upper side 33b of the proximal portion 33a of the flange 33.

The upper end 32a of the upper sheet 32, the proximal portion 33a of the flange 33, the proximal portion 47a of the cover portion 47, and the proximal portion 45a of the flange 45 jointly define a corner clearance 71 therebetween. The statement "inside the dash board 30", as used herein, means a space enclosed with the cowl 12 and the upper sheet 32 of the dash board 30. Most of water drops Wd which has passed through the apertures 42a travel "inside the dash board 30" and then out of the vehicle 10 without being directed into a space between the flanges 33, 45.

Figures 14, 15:
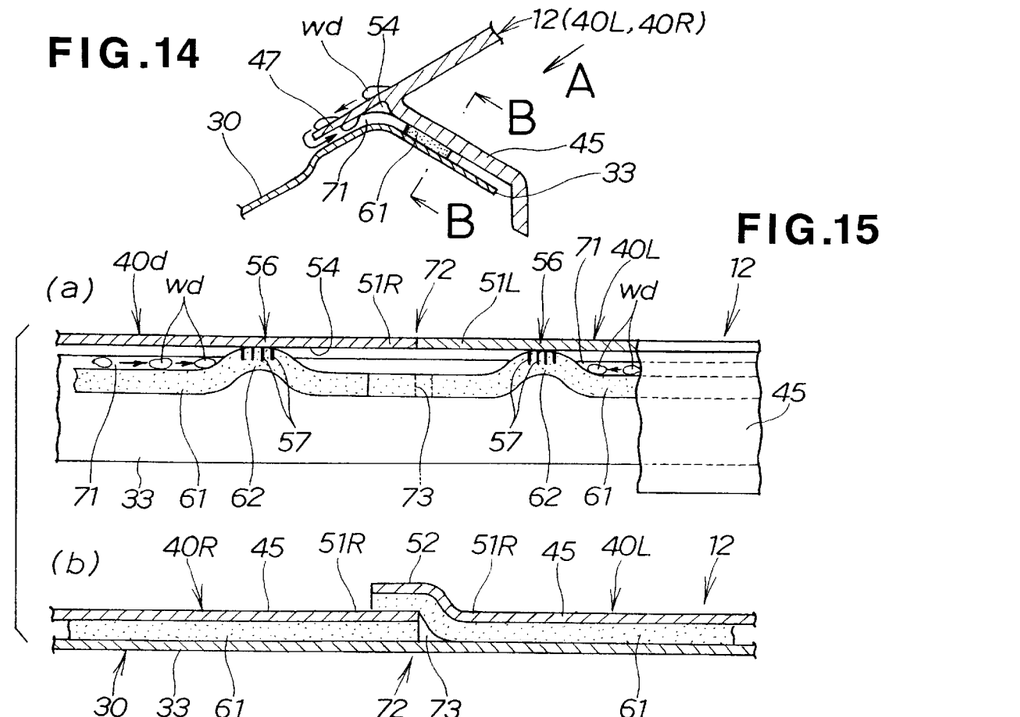
FIG. 14 is a view showing in cross-section either of the right and left halves as viewed sideways.

Part of the water drops Wd on an exterior surface 47d of the cover portion 47 travels across a distal edge 47c of the cover portion 47 along an interior surface 47b of the cover portion 47 to the clearance 71, as shown in FIG. 12. The curved portion 62 is held in intimate contact with the proximal portions 45a, 47a, the upper end 32a, and the proximal portion 33a to block the clearance 71 (as best shown in FIG. 13 and (a) of FIG. 15). With this arrangement, the water drops Wd within the clearance 71 no longer travel to the end 51R of the right half 40R. Likewise, the curved portion 62 of the seal member 61 provided to the left half 40L is arranged to prevent the water drops from moving to the end 51L of the left half 40L (as best shown in (a) of FIG. 15).

Figure 16:
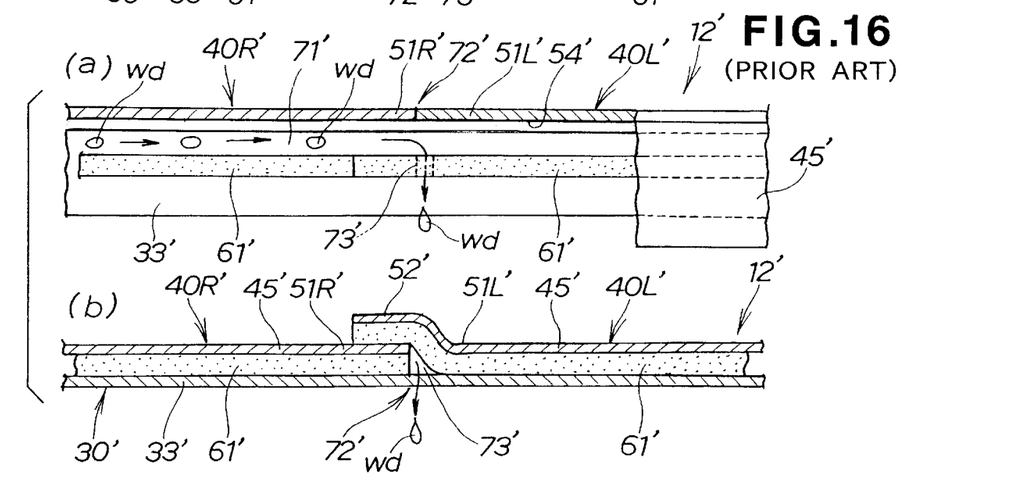

Reference is made to FIG. 14 through FIG. 16. For the purpose of explanation, elements used in right and left halves, as shown in FIG. 16, in common with those of the aforementioned right and left halves as shown in FIG. 14 and FIG. 15 are identically numbered with apostrophes added thereto.

As shown in (a) and (b) of FIG. 16, an overlaying portion 52' of a right half 40L' overlies an end 51R' of a right half 40R'. Flanges 45', 45' of the right and left halves 40R', 40L' are disposed over a flange 33' of a dash board 30'. The flanges 45', 45' overlap at the boundary 72', located widthwise centrally of the vehicle 10, to form a slight gap 73' (hereinafter referred to as "central gap 73'").

Seal members 61', 61' each disposed between the flange 33' and the flanges 45', 45' extend in substantially parallel to the corner portion 54' with a corner clearance 71' formed between the upper end 32a' and the proximal portion 47a' and along the lengths of the seal members 61', 61'. The corner clearance 71' communicates with the central gap 73'. This arrangement is disadvantageous in that part of water drops Wd which has passed through the cowl 12' can travel through the clearance 71' and the central gap 73' into the engine compartment 21.

As shown in FIG. 14 and (a) and (b) of FIG. 15, each part of the seal members 61, 61, that is, each curved portion 62 blocks the corner clearance 71. This makes it possible to prevent water drops Wd within the corner clearance 71 from passing through a central gap 73 into the engine compartment 21.

As is apparent from the foregoing description, the cover portions 47, 47 are disposed to prevent water drops Wd, which has passed through the grill 42, from traveling between the flange 33 and the flanges 45, 45. Even if some of the water drops Wd unfortunately pass into the clearance 71, the travel of the former to the division portion 72 is blocked by the curved portions 62, 62. Therefore, amount of water drops Wd reaching the engine compartment 21 can be kept to a minimum.

The seal members 61, 61 tightly contact the cover portion 47 and the upper end 32a only at the curved portions 62, 62. The seal members 61, 61 are more easily brought into tight contact with the corner portion 54 at the curved portions 62, 62 alone than throughout the lengths thereof. Such seal members 61, 61 and the cowl 12 are easier to assemble.

Portions 56 where the curved portions 62, 62 are in intimate contact with the proximal portions 45a, 47a and with the upper end 32a and the proximal portion 33a to block the clearance 71 are located closely to the boundary 72. This is advantageous in that water drops traveling across the distal edges 47c, 47c and then on the interior surfaces 47b, 47b of greater areas are prevented from reaching the division portion 72.

Each portion 56 has the partition sheets 57 provided thereat. More specifically, these partition sheets 57 are juxtaposed in the widthwise direction of the vehicle body 10a and spaced from each other by the predetermined interval. The partition sheets 57 are interposed between the proximal portion 47a and the proximal portion 45a and cut into the seal members 61, 61. The partition sheets 57 are in sealing engagement with both the curved portions 62, 62 and the corner portions 54, 54.

Since the partition sheets 57 cut into the curved portions 62, 62 for improved sealing engagement with the latter, the curved portions 62, 62 need not intimately contact a bottom of the groove 55.

The seal members 61, 61 provided to the right and left halves 40R, 40L may be made from any material and have a cross-section of any configuration.

The seal members 61, 61 and the corner portions 54, 54 may be each modified in any other manners such that the curved portions 62, 62 establish tight contact with the proximal portions 45a, 47a, the proximal portion 33a, and the upper end 32a. Such modifications are, for example, as follows:

(1) The cowl 12 may be changed in size and shape and the seal member 61 may be changed in material, shape and dimension to bring the curved portions 62, 62 into tight contact with the bottom of the groove 55.

Figure 17:
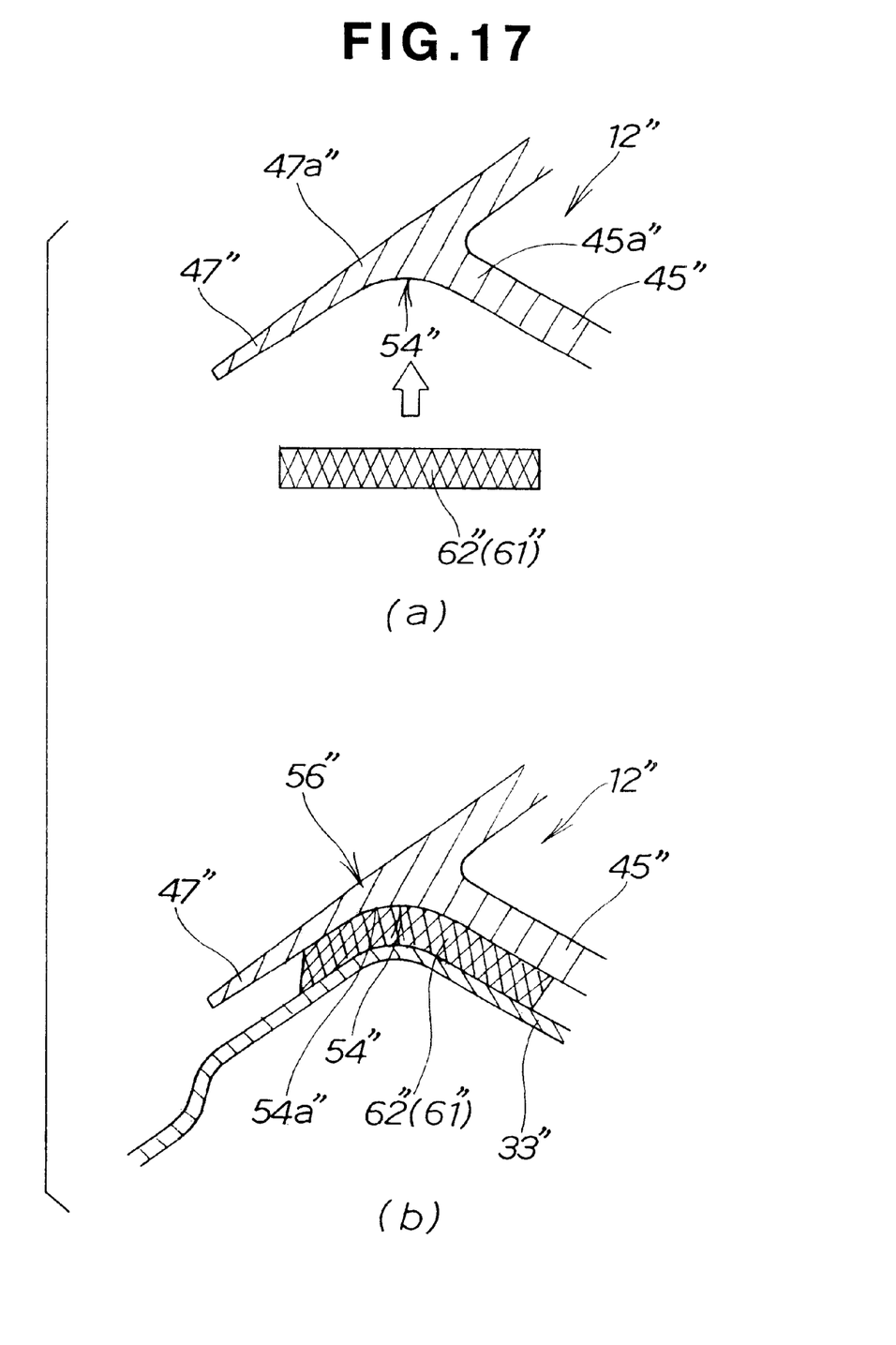

(2) A cowl and a seal member are arranged as will be described next in relation to FIG. 11A and FIG. 11B.

Elements in common with the previously described embodiment are identically numbered with double apostrophes added thereto.

As shown in FIG. 11A and FIG. 11B, unlike the corner portion 54 as discussed above, the corner portion 54" has no grooves formed thereon. No partition sheets 57 are mounted to the corner portion 54". A curved portion 62" of a seal member 61" is in sufficiently tight contact with an interior surface 54a" of a corner portion 54'.

The present disclosure relates to the subject matter of Japanese Patent Application No. 2001-376372, filed Dec. 10, 2001, the disclosure of which is expressly incorporated herein by reference in its entirety.

What is claimed is:

1. A vehicle including a vehicle body having an engine compartment and a passenger compartment formed therein, said vehicle comprising:

(A) a cowl mounted to said vehicle body and having a grill formed therein for taking in external air;

(B) a dash board disposed below said cowl to separate said engine compartment from said passenger compartment;

said dash board including:
(a) a dash board body;
(b) a dash board flange extending from an upper end of said dash board body into said engine compartment;

said cowl extending in a widthwise direction of said vehicle body and comprising right and left halves each including:
(a) a cowl body;
(b) a cowl flange extending from a lower end of said cowl body into said engine compartment to cover said dash board flange;
(c) a cover portion extending from said lower end of said cowl body to cover said upper end of said dash board body; and said dash board flange and said cowl flange having a seal member disposed in a space formed therebetween, said seal member sealing said space, said seal member having a portion tightly contacting said cover portion and said dash board body.

2. A vehicle according to claim 1, wherein said cowl flange and said cover portion have proximal portions formed integrally with said lower end of said cowl body, said proximal portions of said cowl flange and said cover portion tightly contacting said portion of said seal member.

3. A vehicle according to claim 2, wherein said portion of said seal member tightly contacting said proximal portions of said cowl flange and said cover portion is located in the proximity of a boundary between said right and left halves of said cowl.

4. A vehicle according to claim 2, wherein said proximal portions of said cowl flange and said cover portion and said lower end of said cowl body come together to form a corner portion, said corner portion, said proximal portions of said cowl flange and said cover portion and said portion of said seal member tightly contacting said proximal portions of said cowl flange and said cover portion having plural partition sheets provided in a space defined therebetween, said partition sheets being disposed side by side with each other in the widthwise direction of said vehicle body and spaced at predetermined intervals.

* * * * *